United States Patent [19]
Nishio

[11] Patent Number: 5,221,994
[45] Date of Patent: Jun. 22, 1993

[54] ZOOM LENS OF REAR FOCUS TYPE

[75] Inventor: Akihiro Nishio, Kanagawa, Japan

[73] Assignee: Canon Kabushiki Kaisha, Tokyo, Japan

[21] Appl. No.: 890,687

[22] Filed: May 29, 1992

[30] Foreign Application Priority Data

Jun. 7, 1991 [JP] Japan .................................. 3-163646

[51] Int. Cl.⁵ ...................... G02B 15/14; G02B 13/18
[52] U.S. Cl. .................................... 359/684; 359/687; 359/708
[58] Field of Search ................ 359/677, 684, 687, 708

[56] References Cited

U.S. PATENT DOCUMENTS

| | | | |
|---|---|---|---|
| 5,009,492 | 4/1991 | Hamano | 359/684 |
| 5,056,900 | 10/1991 | Mukaiya et al. | 359/676 |
| 5,134,524 | 7/1992 | Hamano et al. | 359/687 |
| 5,138,492 | 8/1992 | Hamano et al. | 359/684 |

FOREIGN PATENT DOCUMENTS

| | | |
|---|---|---|
| 62-24213 | 2/1987 | Japan . |
| 63-29718 | 2/1988 | Japan . |
| 2-48621 | 2/1990 | Japan . |
| 2-53017 | 2/1990 | Japan . |

*Primary Examiner*—Scott J. Sugarman
*Attorney, Agent, or Firm*—Fitzpatrick, Cella, Harper & Scinto

[57] ABSTRACT

A zoom lens is disclosed, having four lens units of positive, negative, positive and positive refractive powers in this order from the object side, the focal length being varied by moving the second lens unit, and compensation for the image shift with zooming and focusing being performed by moving the fourth lens unit, while the first and third lens units remain stationary. The third lens unit has a positive first lens and a negative second lens having a concave surface facing the object side. The fourth lens unit has a negative first lens, a positive second lens and a positive third lens. The zoom lens satisfies the following conditions:

$$0.54 < f31/F3 < 0.7$$

$$1.35 < N4P < 1.67$$

$$51.8 < \nu 4P < 75$$

where F3 is the focal length of the third lens unit, f31 is the focal length of the positive first lens in the third lens unit, and N4P and ν4P are respectively mean values of the refractive index and Abbe number of materials of the second and third lenses in the fourth lens unit.

2 Claims, 7 Drawing Sheets

ZOOM LENS OF REAR FOCUS TYPE

BACKGROUND OF THE INVENTION

1. Field of the Invention

This invention relates to zoom lenses of the rear focus type and, more particularly, to large relative aperture, high range zoom lenses of the rear focus type having a zoom ratio of 10 and an F-number of 1.8 or thereabout for use in photographic cameras, video cameras or cameras for broadcasting.

2. Description of the Related Art

For the photographic camera or video camera, a wide variety of zoom lenses having the focusing provision in a lens unit other than the first lens unit when counted from the object side, that is, employing the so-called rear focus type, have been proposed.

In general, the rear focus type, because of the focusing lens unit being relatively small in size and light in weight, has advantages in that a small driving power for the focusing lens unit is sufficient, and rapid focusing can be performed, etc.

For example, Japanese Laid-Open Patent Applications Nos. Sho 62-24213, Sho 63-29718, Hei 2-48621 and Hei 2-53017 have proposed the rear focus type of zoom lenses each of which comprises, from front to rear, a first lens unit of positive refractive power, a second lens unit of negative refractive power for varying the focal length, a third lens unit of positive refractive power and a fourth lens unit of positive refractive power, totaling four lens units, the first and third lens units being stationary, the second lens unit being moved to vary the focal length, while the fourth lens unit is simultaneously moved to compensate for the shift of an image plane, and focusing being performed by moving the fourth lens unit.

Particularly, in the above-mentioned Japanese Laid-Open Patent Application No. Hei 2-53017, an aspheric surface is used in the third lens unit so that the third lens unit is constructed with a single lens element. Thus, a zoom lens of the rear focus type whose total length is shortened to a compact form is proposed.

From the use of the rear focus type in the zoom lens, there are obtained, in the general case, the advantages that the bulk and size of the entire lens system are minimized, that a high-speed focusing becomes possible, and further that the focusing range becomes easy to extend toward shorter object distances.

On the other hand, however, the variation of aberrations with focusing is caused to increase. Thus, a problem arises in that it becomes very difficult to obtain a high optical performance from an infinitely distant object to a closest object, i.e., over all the object distances, in such a manner that the bulk and size of the entire lens system are minimized. Particularly, in the zoom lens of a large relative aperture and as high a range as 10 or thereabout in the zoom ratio, it becomes very difficult to obtain a high optical performance throughout the entire zooming range as well as the entire focusing range, giving rise to another problem.

SUMMARY OF THE INVENTION

The present invention employs the rear focus type to achieve an increase of the aperture ratio, an increase of the range of variation of the magnification and a shortening of the total length of the entire lens. It is, therefore, an object of the invention to provide a zoom lens of the rear focus type of simple structure having a good optical performance over the range of variation of the focal length from the wide-angle end to the telephoto end, i.e., the entire zooming range, and over all the object distances from an infinitely distant object to a closest object, i.e., over the entire focusing range.

In addition, the present invention properly determines which of the lens units an aspheric surface is applied to and the shape of the aspheric surface. It is, therefore, another object of the invention to provide a zoom lens of the rear focus type which has easily achieved an increase of the range of variation of the focal length to about 10, while reducing the number of lens elements, thus getting a simple structure.

BRIEF DESCRIPTION OF THE DRAWINGS

In the explanation diagram, the sectional views and the graphs described above, L1 stands for the first lens unit, L2 for the second lens unit, L3 for the third lens unit, L4 for the fourth lens unit, SP for a stop, $\Delta S$ for the sagittal image surface, $\Delta M$ for the meridional image surface, d for the d-line and g for the g-line.

DETAILED DESCRIPTION OF THE PREFERRED EMBODIMENTS

Figure 1:
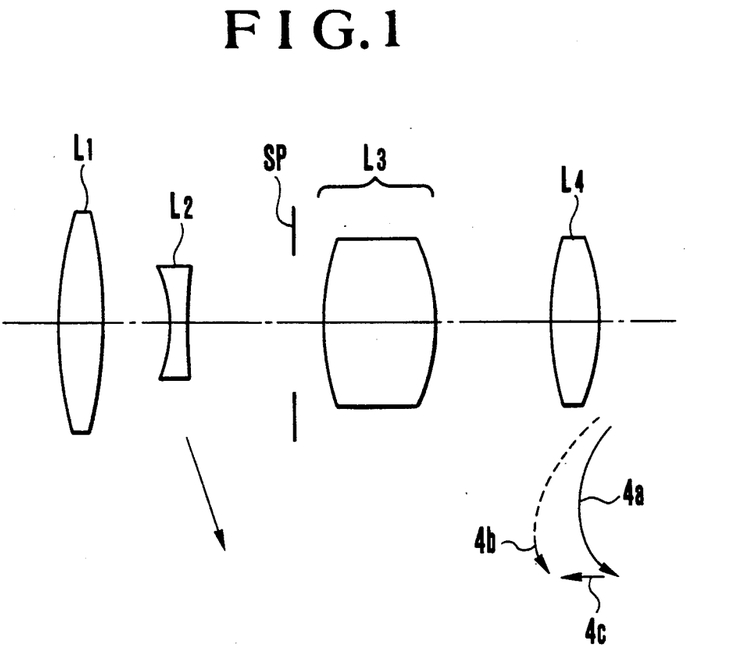
FIG. 1 is a diagram for explaining the paraxial refractive power arrangement of the invention.
Figure 2:
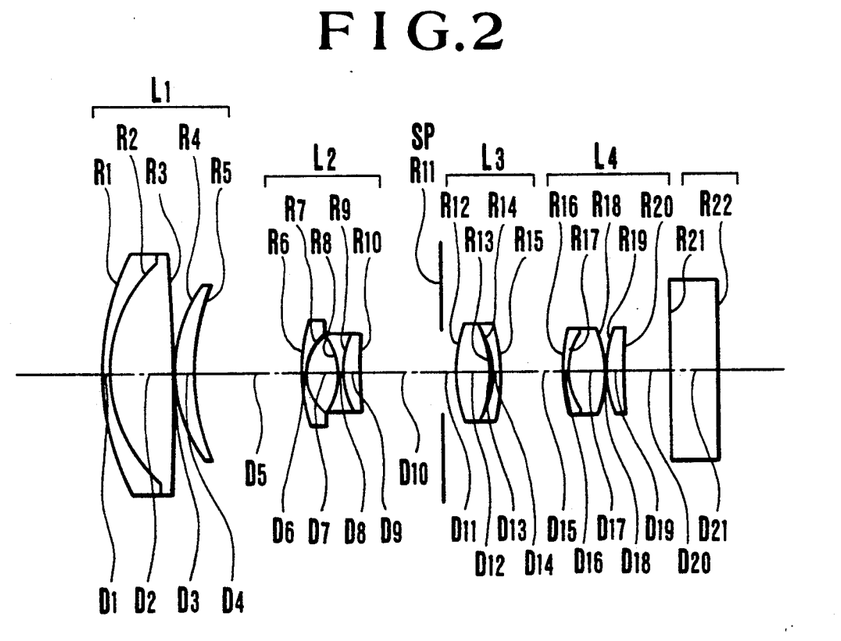
FIG. 2 is a longitudinal section view of a numerical example 1 of a zoom lens of the invention.
Figure 3:
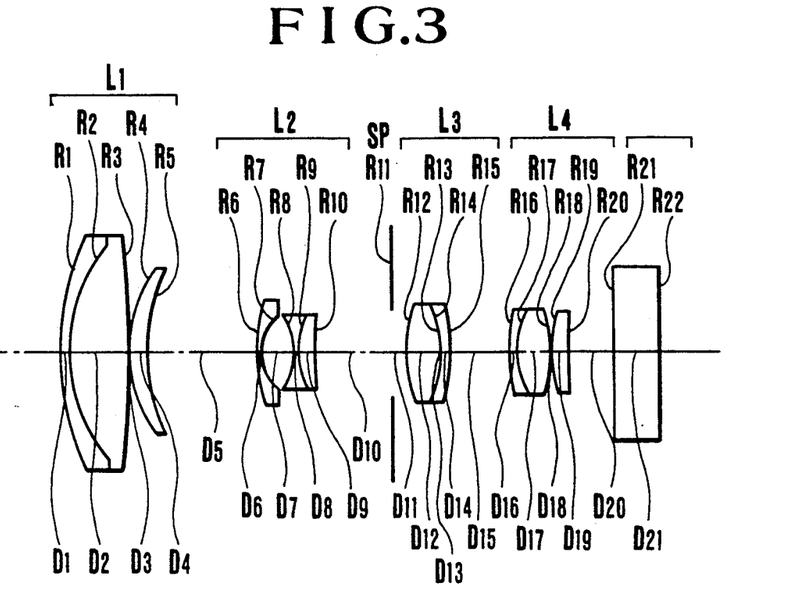
FIG. 3 is a longitudinal section view of a numerical example 2 of a zoom lens of the invention.
Figure 4:
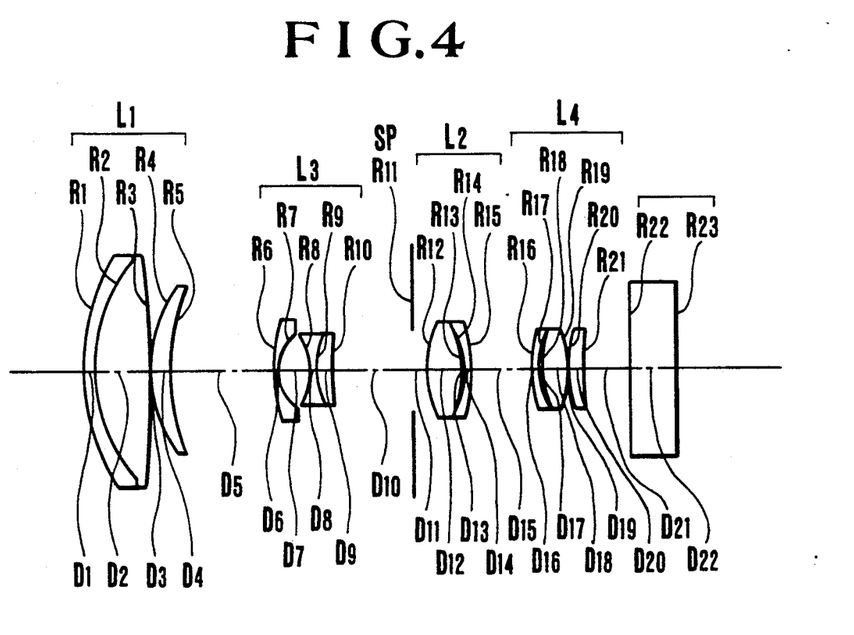
FIG. 4 is a longitudinal section view of a numerical example 3 of a zoom lens of the invention.
Figure 5:
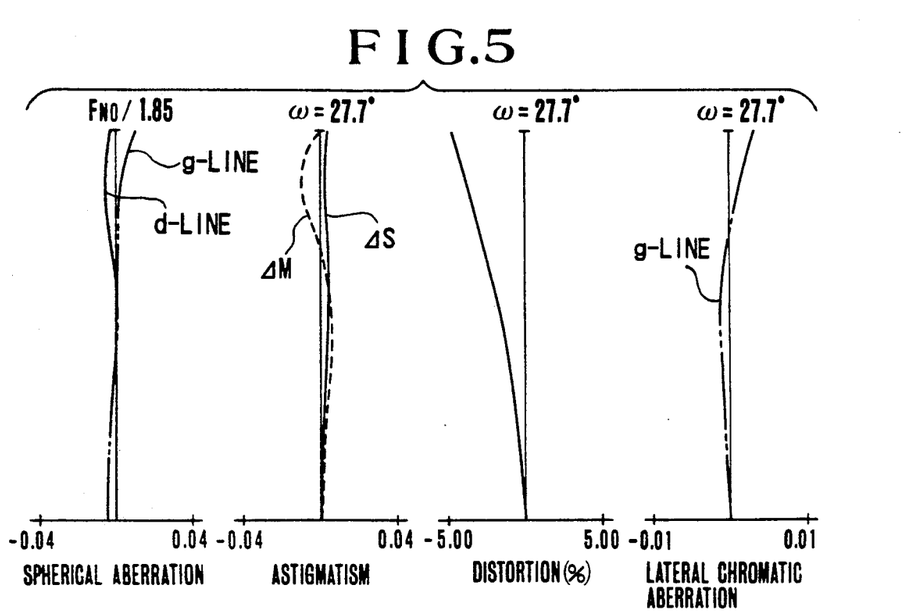
FIG. 5 shows graphs of the various aberrations of the numerical example 1 of the invention in the wide angle end.
Figure 6:
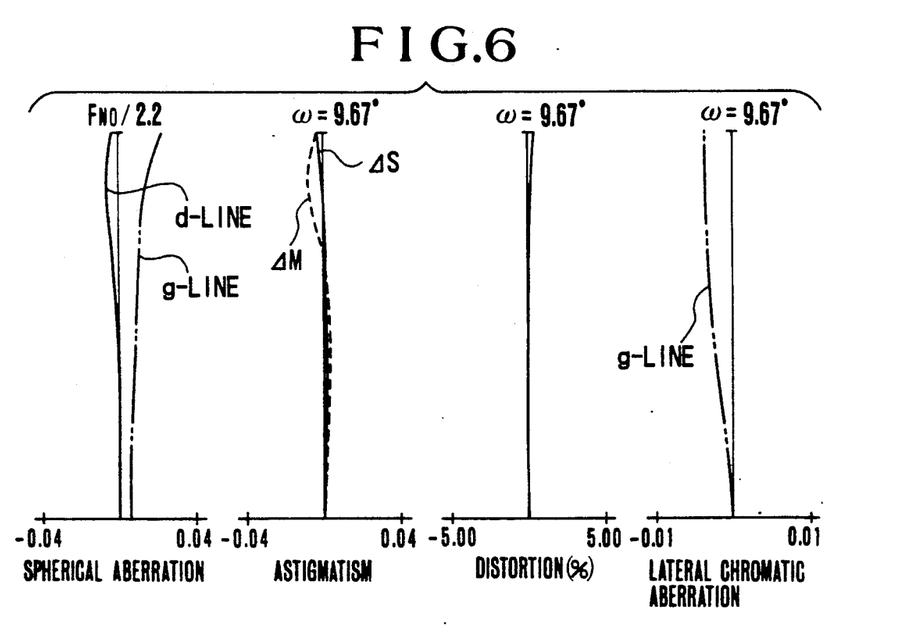
FIG. 6 shows graphs of the various aberrations of the numerical example 1 of the invention in an intermediate position.
Figure 7:
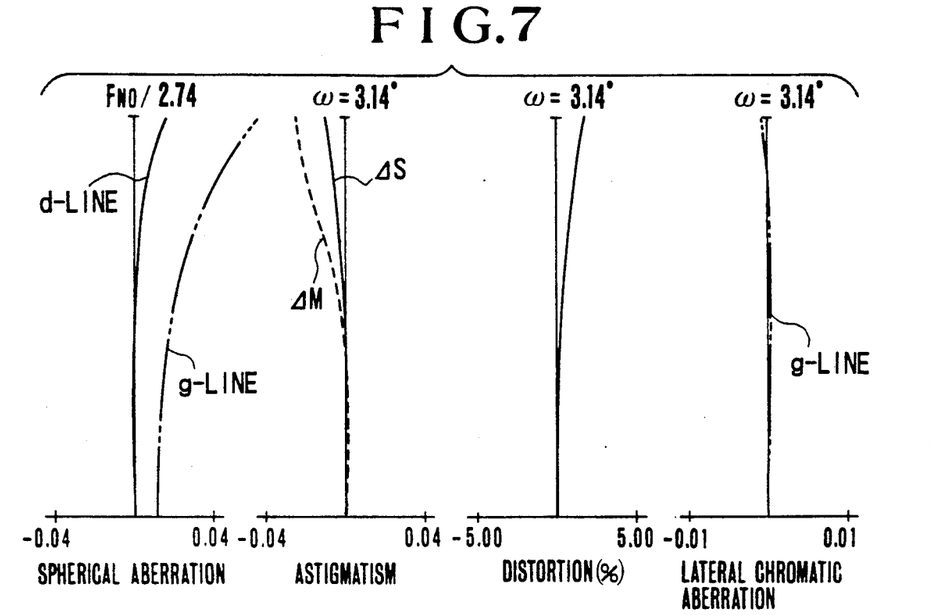
FIG. 7 shows graphs of the various aberrations of the numerical example 1 of the invention in the telephoto end.
Figure 8:
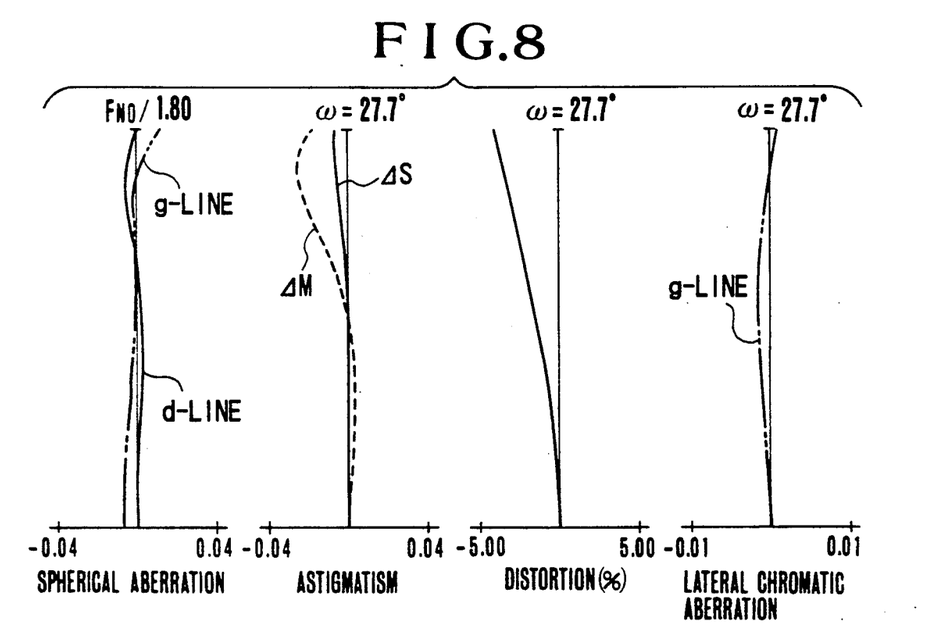
FIG. 8 shows graphs of the various aberrations of the numerical example 2 of the invention in the wide angle end.
Figure 9:
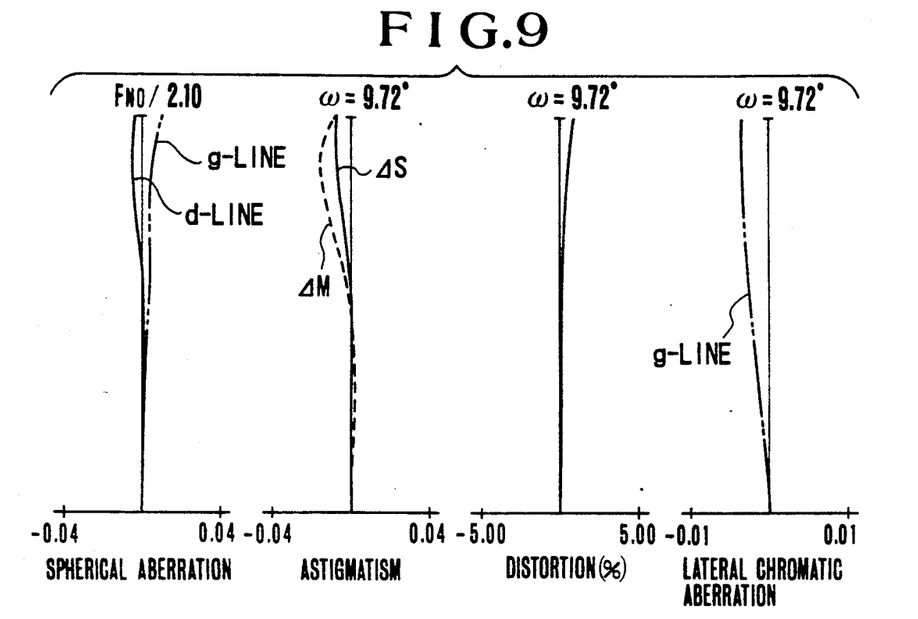
FIG. 9 shows graphs of the various aberrations of the numerical example 2 of the invention in an intermediate position.
Figure 10:
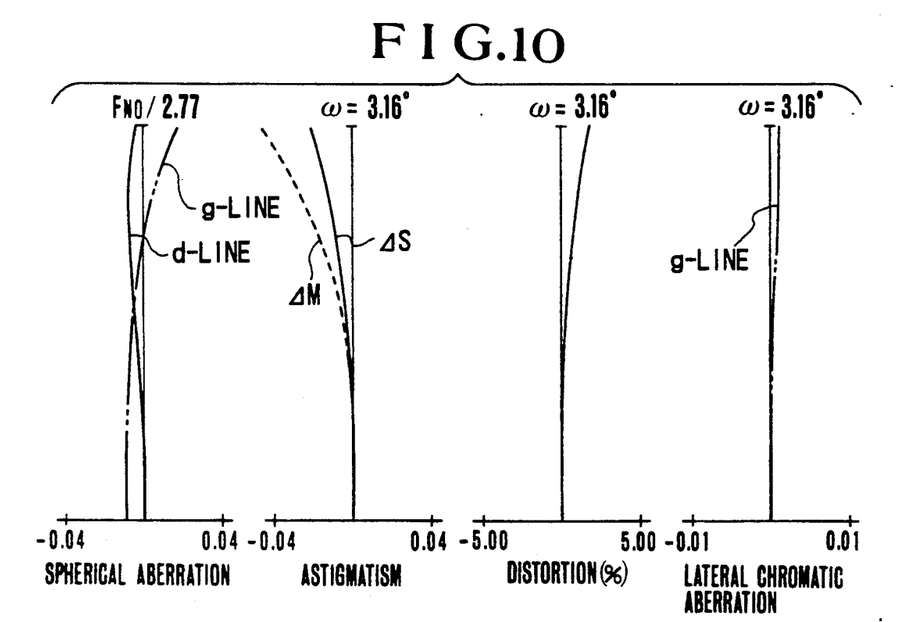
FIG. 10 shows graphs of the various aberrations of the numerical example of the invention in the telephoto end.
Figure 11:
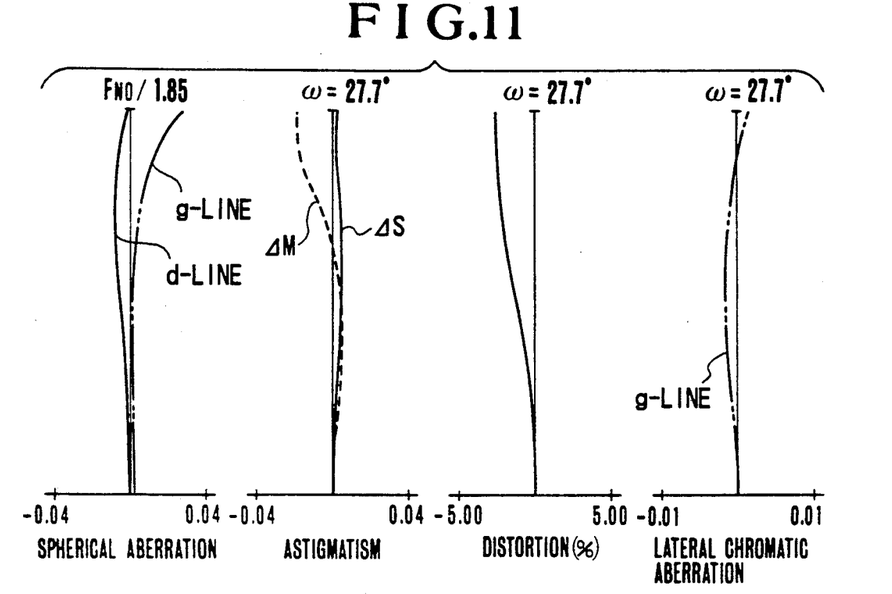
FIG. 11 shows graphs of the various aberrations of the numerical example of the invention in the wide-angle end.
Figure 12:
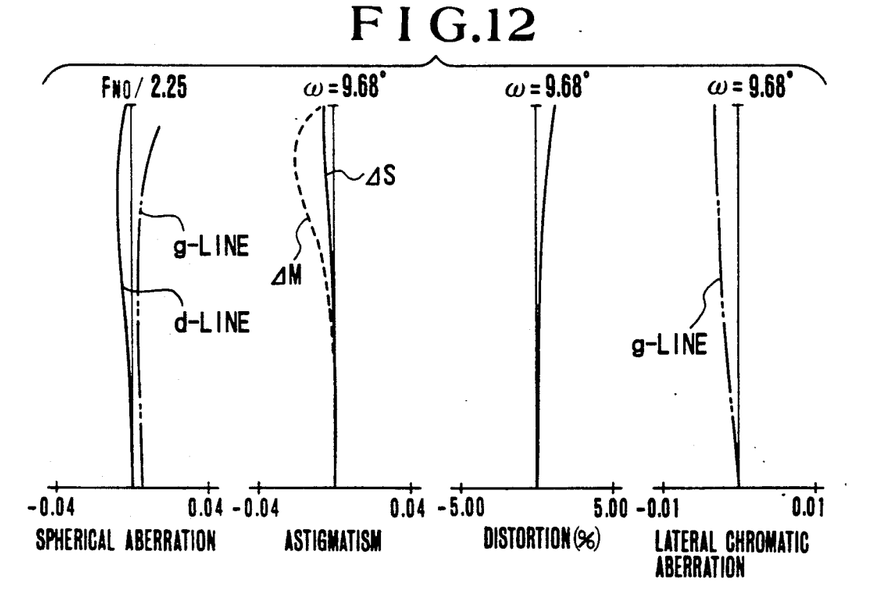
FIG. 12 shows graphs of the various aberrations of the numerical example of the invention in an intermediate position.
Figure 13:
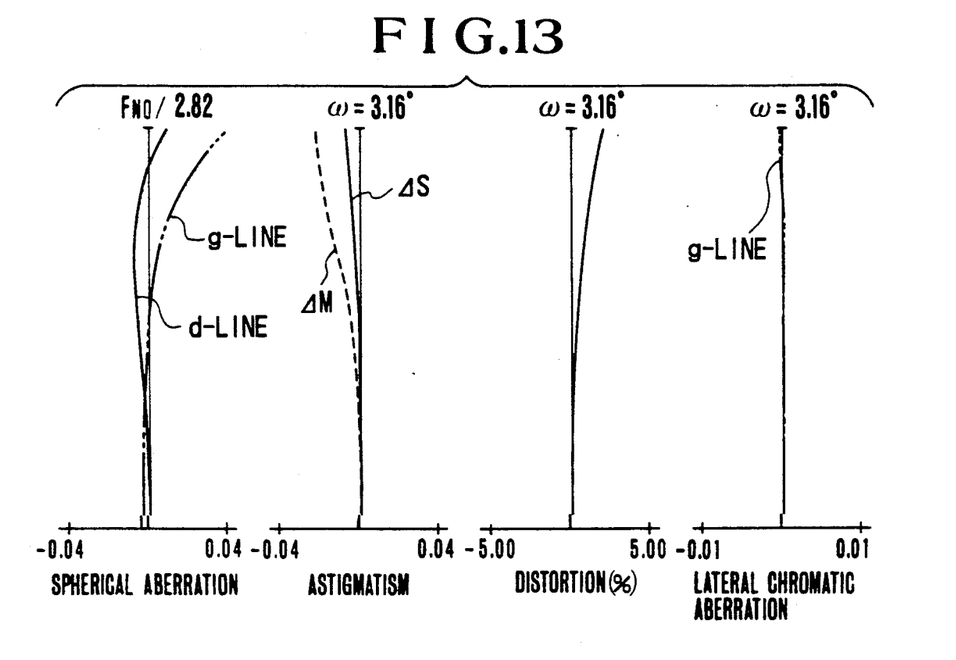
FIG. 13 shows graphs of the various aberrations of the numerical example 3 of the invention in the telephoto end.

FIG. 1 is a schematic diagram showing the paraxial refractive power arrangement of the zoom lens of the rear focus type of the invention. FIGS. 2 to 4 are longitudinal sectional views of numerical examples 1 to 3 of the invention, respectively.

In the drawings, L1 denotes the first lens unit of positive refractive power, L2 denotes the second lens unit of negative refractive power, L3 denotes the third lens unit of positive refractive power, and L4 denotes the fourth lens unit of positive refractive power.

During zooming from the wide-angle end to the telephoto end, the second lens unit is moved toward the image side, while the fourth lens unit is simultaneously moved to compensate for the shift of an image plane resulting from the variation of the focal length.

Also, focusing is performed by axially moving the fourth lens unit, that is, the rear focus type is employed. In FIG. 1, the fourth lens unit, when compensating for the image shift resulting from the zooming from the wide-angle end to the telephoto end while focusing on an infinitely distant object or a closest object, moves depicting a locus shown by a solid line curve 4a or a dashed line curve 4b, respectively. Incidentally, the first lens unit and the third lens unit remain stationary during zooming and during focusing.

In the present embodiment, both the compensating provision for the image shift with zooming and the focusing provision are made in the fourth lens unit. Particularly, the locus is made convex toward the object side when zooming from the wide-angle end to the telephoto end, as shown by the curve 4a or 4b. Accordingly, the space between the third and fourth lens units is efficiently utilized to advantageously shorten the total length of the entire lens system.

In the present embodiment, when focusing on an infinitely distant object to a closest object at, for example, the telephoto end, the fourth lens unit is moved forward, as shown by a straight line 4c in FIG. 1.

In the present embodiment, as compared with the conventional type of zoom lens in which the first lens unit is moved forward to effect focusing, the use of such a rear focus type as described above enables the first lens unit which is very susceptible to decentering to be made stationary. Because the lowering of the performance by the decentering is minimized, the effective diameter of the first lens unit is prevented from increasing with a high efficiency.

Also, an aperture stop SP is positioned in front of the third lens unit. Accordingly, the separations between those of the lens units which lie ahead of the aperture stop are shortened, thus easily achieving a shortening of the effective diameter of the front lens members.

The third lens unit has a positive first lens and a negative second lens having a concave surface facing the object side. The fourth lens unit has a negative first lens, a positive second lens and a positive third lens. Letting the focal length of the third lens unit be denoted by F3, the focal length of the first lens of the third lens unit by f31, the mean values of the refractive index and Abbe number of the materials of the second and third lenses of the fourth lens unit by N4P and ν4P, respectively, the following conditions are satisfied:

$$0.54 < f31/F3 < 0.7 \quad (1)$$

$$1.35 < N4P < 1.67 \quad (2)$$

$$51.8 < \nu4P < 75 \quad (3)$$

In such a manner, the third lens unit is made constructed so as to have the positive first lens and the negative second lens, totaling two lenses, to thereby well correct various aberrations, particularly chromatic aberrations as the range of variation of the focal length is increased. In addition, with the construction and arrangement of the lens elements described above, the various optical parameters for each of the lens elements are set forth by the conditions (1) to (3). In conclusion, the bulk and size of the entire lens system are minimized, while still well correcting the variation of aberrations with zooming and with focusing by using the fourth lens unit.

The technical significance of each of the abovedescribed conditions is explained below.

The inequalities of condition (1) give a proper range for the ratio of the refractive powers of the third lens unit and the positive first lens in the third lens unit and have an aim to well correct aberrations, particularly spherical aberration, and, at the same time, off-axial aberrations in good balance, over the entire zooming range.

When the refractive power of the positive first lens is too strong as exceeding the lower limit of the condition (1), it becomes difficult to advantageously correct various aberrations in cooperation with the negative second lens in the third lens unit. Also, higher order spherical aberrations become under-corrected.

When the refractive power of the positive first lens is too weak as exceeding the upper limit of the condition (1), the refractive power of the negative second lens in the third lens unit has to increase relatively. This results in over-correction of higher order spherical aberrations. Also, the zonal spherical aberration increases, which becomes difficult to correct well. Further, the Petzval sum increases in the negative sense, causing the curvature of field and astigmatism to increase objectionably.

The inequalities of conditions (2) and (3) give proper ranges for the means values of the refractive index and Abbe number of the materials of the second and third positive lenses in the fourth lens unit and have an aim to well correct chromatic aberrations and off-axial aberrations over the entire zooming range and the entire focusing range.

When the upper limit of the condition (2) is exceeded, the negative Petzval sum increases so largely that the curvature of field and the astigmatism become difficult to correct well. When the lower limit is exceeded, the curvatures of the surfaces of the positive lens in the fourth lens unit becomes so strong that higher order comas are produced, which are difficult to correct well.

When the upper limit or the lower limit of the condition (3) is exceeded, it becomes difficult to well correct the variation of the chromatic aberrations with zooming and focusing.

The zoom lens of the rear focus type according to the present invention is achieved by satisfying all the conditions described above. To extend the range of variation of the focal length with the limitation of the size of the lens system to a minimum, while well correcting the variation of aberrations to obtain a high optical performance, it is desirable to satisfy at least one of the following additional features (i) to (iii).

(i) An aspheric surface is applied to at least one of the surfaces of the positive lens in the third lens unit in such a manner that the positive refractive power gets progressively weaker from the center of the area of the lens surface to the marginal zone. This enables good correction of higher order aberrations to be performed as the zoom ratio is increased to 10 or thereabout.

(ii)

$$1.1 < R3,2/R3,3 < 1.45 \quad (4)$$

where R3,2 is the radius of curvature of the rear surface of the positive first lens in the third lens unit, and R3,3 is the radius of curvature of the front surface of the negative second lens in the third lens unit.

When the curvature of the front surface of the negative second lens is too strong as exceeding the upper limit of the condition (4), the curvature of field increases so largely that it becomes difficult to correct the curvature of field and the spherical aberration in good balance. When the curvature of the surface is too weak as exceeding the lower limit, the spherical aberration comes to be under-corrected.

(iii) The first lens unit is constructed with, in the order from the object side, a negative lens of meniscus shape convex toward the object side and two positive lenses, totaling three lenses, and the second lens unit is constructed with a negative lens of meniscus shape concave toward the image side, a negative lens of biconcave form and a positive lens, totaling three lenses, wherein letting the focal length of the second lens unit be denoted by F2, and the shortest and longest focal lengths of the entire lens system by FW and FT, the following condition is satisfied:

$$0.3 < |F2/\sqrt{FW \cdot FT}| < 0.45 \quad (5)$$

The inequalities of condition (5) have an aim to advantageously shorten the total length of the entire lens system, while suppressing the variation of aberrations with zooming.

When the negative refractive power of the second lens unit is too weak as exceeding the upper limit, the amount of movement of the second lens unit must be increased to obtain an equivalent zoom ratio. This causes the total length of the entire lens system to increase.

When the negative refractive power of the second lens unit is too strong as exceeding the lower limit, the negative Petzval sum increases so largely that the curvature of field becomes large and it becomes difficult to well correct coma.

Next, numerical examples 1 to 3 of the invention are shown. In the numerical data of these example, Ri is the radius of curvature of the i-th lens surface when counted from the object side, Di is the i-th lens thickness or air separation, and Ni and $\nu i$ are respectively the refractive index and Abbe number of the glass of the i-th lens element.

Incidentally, R21 and R22 in the numerical examples 1 and 2 and R22 and R23 in the numerical example 3 define a face plate or like glass block.

The shape of the aspheric surface is expressed in the coordinates with an X-axis in the axial direction and with an H-axis in the direction perpendicular to the optical axis, the direction in which light advances being taken as positive, by the following equation:

$$X = \frac{(1/R)H^2}{1 + \sqrt{1 - (H/R)^2}} + AH^2 + BH^4 + CH^6 + DH^8$$

where R is the radius of osculating sphere and A, B, C and D are the aspheric coefficients.

D(-0x) means $10^{-x}$.

The values of the factors in the conditions (1) to (5) for the numerical examples 1 to 3 are listed in Table-1.

Numerical Example 1: (FIGS. 2, 5, 6 and 7)

F = 1-9.57    FNO= 1:1.85-2.74    $2\omega = 55.4°-6.28°$

| | | | |
|---|---|---|---|
| R1 = 4.946 | D1 = 0.163 | N1 = 1.80518 | $\nu1$ = 25.4 |
| R2 = 3.033 | D2 = 1.090 | N2 = 1.58913 | $\nu2$ = 61.2 |
| R3 = −26.510 | D3 = 0.032 | | |
| R4 = 2.977 | D4 = 0.327 | N3 = 1.60311 | $\nu3$ = 60.7 |
| R5 = 4.339 | D5 = Variable | | |
| R6 = 3.442 | D6 = 0.098 | N4 = 1.88300 | $\nu4$ = 40.8 |
| R7 = 1.034 | D7 = 0.588 | | |
| R8 = −1.240 | D8 = 0.082 | N5 = 1.48749 | $\nu5$ = 70.2 |
| R9 = 1.691 | D9 = 0.295 | N6 = 1.84666 | $\nu6$ = 23.8 |
| R10 = 11.299 | D10 = Variable | | |
| R11 = ∞ Stop | D11 = 0.245 | | |
| R12 = 2.573 Aspheric | D12 = 0.590 | N7 = 1.58313 | $\nu7$ = 59.4 |
| R13 = −2.662 | D13 = 0.049 | | |
| R14 = −2.183 | D14 = 0.114 | N8 = 1.78590 | $\nu8$ = 44.2 |
| R15 = −4.267 | D15 = Variable | | |
| R16 = 4.143 | D16 = 0.114 | N9 = 1.84666 | $\nu9$ = 23.8 |
| R17 = 1.549 | D17 = 0.639 | N10 = 1.51742 | $\nu10$ = 52.4 |
| R18 = −2.843 | D18 = 0.024 | | |
| R19 = 3.107 | D19 = 0.278 | N11 = 1.51633 | $\nu11$ = 64.1 |
| R20 = 9.523 | D20 = Variable | | |
| R21 = ∞ | D21 = 0.819 | N12 = 1.51633 | $\nu12$ = 64.1 |
| R22 = ∞ | | | |

R12: Aspheric Surface
A = 0.0
B = −1.421D-02
C = 6.464D-03
D = −2.421D-03

| Variable Separation | Focal Length | | |
|---|---|---|---|
| | 1.00 | 3.08 | 9.57 |
| D5 | 0.13 | 1.92 | 3.11 |
| D10 | 3.22 | 1.44 | 0.25 |
| D15 | 1.11 | 0.50 | 1.15 |
| D20 | 0.82 | 1.43 | 0.86 |

Numerical Example 2: (FIGS. 3, 8, 9 and 10)

F = 1-9.5    FNO= 1:1.80-2.77    $2\omega = 55.4°-6.28°$

| | | | |
|---|---|---|---|
| R1 = 5.667 | D1 = 0.163 | N1 = 1.80518 | $\nu1$ = 25.4 |
| R2 = 3.283 | D2 = 1.090 | N2 = 1.58913 | $\nu2$ = 61.2 |
| R3 = −19.526 | D3 = 0.032 | | |
| R4 = 2.877 | D4 = 0.327 | N3 = 1.62230 | $\nu3$ = 53.2 |
| R5 = 4.255 | D5 = Variable | | |
| R6 = 3.424 | D6 = 0.098 | N4 = 1.88300 | $\nu4$ = 40.8 |
| R7 = 1.052 | D7 = 0.589 | | |
| R8 = −1.325 | D8 = 0.082 | N5 = 1.51823 | $\nu5$ = 59.0 |
| R9 = 1.727 | D9 = 0.295 | N6 = 1.84666 | $\nu6$ = 23.8 |
| R10 = 24.237 | D10 = Variable | | |
| R11 = ∞ Stop | D11 = 0.245 | | |
| R12 = 2.575 Aspheric | D12 = 0.623 | N7 = 1.58313 | $\nu7$ = 59.4 |
| R13 = −2.496 | D13 = 0.037 | | |
| R14 = −2.186 | D14 = 0.114 | N8 = 1.78590 | $\nu8$ = 44.2 |
| R15 = −4.754 | D15 = Variable | | |
| R16 = 4.095 | D16 = 0.114 | N9 = 1.84666 | $\nu9$ = 23.8 |
| R17 = 1.566 | D17 = 0.623 | N10 = 1.52310 | $\nu10$ = 50.8 |
| R18 = −2.926 | D18 = 0.024 | | |
| R19 = 3.008 | D19 = 0.278 | N11 = 1.51633 | $\nu11$ = 64.1 |
| R20 = 9.745 | D20 = Variable | | |
| R21 = ∞ | D21 = 0.819 | N12 = 1.51633 | $\nu12$ = 64.1 |
| R22 = ∞ | | | |

R12: Aspheric Surface
A = 0.0
B = −1.569D-02
C = 7.223D-03
D = −3.273D-03

| Variable | Focal Length |
|---|---|

-continued

| Variable Separation | 1.00 | 3.06 | 9.50 |
|---|---|---|---|
| D5 | 0.13 | 1.95 | 3.17 |
| D10 | 3.22 | 1.40 | 0.18 |
| D15 | 1.09 | 0.56 | 1.32 |
| D20 | 0.82 | 1.35 | 0.59 |

Numerical Example 3: (FIGS. 4, 11, 12 and 13)

F = 1-9.5   FNO= 1:1.85-2.82   2ω = 55.4°-6.32°

| R1 = 4.505 | D1 = 0.163 | N1 = 1.80518 | ν1 = 25.4 |
| R2 = 2.968 | D2 = 1.090 | N2 = 1.51633 | ν2 = 64.1 |
| R3 = −17.857 | D3 = 0.032 | | |
| R4 = 3.015 | D4 = 0.327 | N3 = 1.60311 | ν3 = 60.7 |
| R5 = 4.581 | D5 = Variable | | |
| R6 = 3.442 | D6 = 0.098 | N4 = 1.88300 | ν4 = 40.8 |
| R7 = 1.017 | D7 = 0.588 | | |
| R8 = −1.275 | D8 = 0.082 | N5 = 1.48749 | ν5 = 70.2 |
| R9 = 1.641 | D9 = 0.295 | N6 = 1.84666 | ν6 = 23.8 |
| R10 = 10.618 | D10 = Variable | | |
| R11 = ∞ Stop | D11 = 0.245 | | |
| R12 = 2.384 Aspheric | D12 = 0.623 | N7 = 1.58313 | ν7 = 59.4 |
| R13 = −2.649 | D13 = 0.070 | | |
| R14 = −2.017 | D14 = 0.114 | N8 = 1.74077 | ν8 = 27.8 |
| R15 = −4.414 | D15 = Variable | | |
| R16 = 2.967 | D16 = 0.131 | N9 = 1.84666 | ν9 = 23.8 |
| R17 = 1.879 | D17 = 0.067 | | |
| R18 = 3.015 | D18 = 0.426 | N10 = 1.48749 | ν10 = 70.2 |
| R19 = −3.015 | D19 = 0.024 | | |
| R20 = 2.786 | D20 = 0.278 | N11 = 1.48749 | ν11 = 70.2 |
| R21 = 10.084 | D21 = Variable | | |
| R22 = ∞ | D22 = 0.819 | N12 = 1.51633 | ν12 = 64.1 |
| R23 = ∞ | | | |

R12: Aspheric Surface
A = 0.0
B = −7.767D-03
C = 1.563D-03
D = 1.829D-03

| Variable Separation | 1.00 | 3.07 | 9.50 |
|---|---|---|---|
| D5 | 0.13 | 1.92 | 3.11 |
| D10 | 3.22 | 1.44 | 0.25 |
| D15 | 1.15 | 0.52 | 1.15 |
| D21 | 0.82 | 1.45 | 0.82 |

| Condition | Numerical Example | | |
|---|---|---|---|
| | 1 | 2 | 3 |
| (1) f31/F3 | 0.629 | 0.602 | 0.605 |
| (2) N4P | 1.5169 | 1.5197 | 1.4875 |
| (3) ν 4P | 58.28 | 57.50 | 70.21 |
| (4) R3,2/R3,3 | 1.219 | 1.142 | 1.313 |
| (5) $F2/\sqrt{FW \cdot FT}$ | 0.349 | 0.370 | 0.350 |

According to the invention, the refractive powers of the four lens units and the condition in which the second and fourth lens units move are set fourth as described above, and the lens configuration that, when focusing, the fourth lens unit is moved is employed. This enables the size of the entire lens system to be minimized at a zoom ratio of 10 or thereabout, while still permitting good aberration correction to be achieved over the entire zooming range. In addition, the variation of aberrations with focusing is made little. Thus, it is made possible to provide a zoom lens of the rear focus type having a high optical performance at a large aperture ratio of 1.8 in F-number.

What is claimed is:

1. A zoom lens comprising, from an object side, a first lens unit of positive refractive power, a second lens unit of negative refractive power, a third lens unit of positive refractive power and a fourth lens unit of positive refractive power, said first and third lens units being made stationary, said second lens unit being moved to vary the image magnification, while the shift of an image plane resulting from the variation of the image magnification is compensated for by moving said fourth lens unit, focusing being performed by moving said fourth lens unit, said third lens unit having a positive lens and a negative lens having a concave surface facing the object side, said fourth lens unit having a negative first lens, a positive second lens and a positive third lens, and the following conditions being satisfied:

$$0.54 < f31/F3 < 0.7$$

$$1.35 < N4P < 1.67$$

$$51.8 < \nu 4P < 75$$

where F3 is the focal length of said third lens unit, f31 is the focal length of said positive lens in said third lens unit, and N4P and μ4P are respectively mean values of the refractive index and Abbe number of materials of said second lens and said third lens in said fourth lens unit.

2. A zoom lens according to claim 1, wherein at least one of lens surfaces of said positive lens in said third lens unit is an aspheric surface of such shape that a positive refractive power gets progressively weaker from the center of the lens surface toward its marginal zone.

* * * * *

UNITED STATES PATENT AND TRADEMARK OFFICE
CERTIFICATE OF CORRECTION

PATENT NO. : 5,221,994
DATED : June 22, 1993
INVENTOR(S) : AKIHIRO NISHIO

It is certified that error appears in the above-identified patent and that said Letters Patent is hereby corrected as shown below:

Column 4:
 Line 6, "abovede-" should read --above-de--.
 Line 32, "means" should read --mean--.
 Line 43, "becomes" should read --become--.

Column 5:
 Line 45, "example," should read --examples--.

Column 8:
 Line 10, "fourth" (second occurrence) should read --forth--.
 Line 45, "$\mu 4P$" should read --$\upsilon 4P$--.

Signed and Sealed this

Fifth Day of April, 1994

Attest:

BRUCE LEHMAN

Attesting Officer    Commissioner of Patents and Trademarks